United States Patent
Elwood et al.

(10) Patent No.: US 7,552,029 B2
(45) Date of Patent: Jun. 23, 2009

(54) EQUIPMENT MONITORING SYSTEM AND METHOD

(75) Inventors: Bryan M. Elwood, Candler, NC (US); Richard H. Bair, III, Asheville, NC (US); Charles G. Butts, Weaverville, NC (US)

(73) Assignee: Thermo Fisher Scientific Inc., Waltham, MA (US)

( * ) Notice: Subject to any disclaimer, the term of this patent is extended or adjusted under 35 U.S.C. 154(b) by 0 days.

(21) Appl. No.: 10/022,194

(22) Filed: Dec. 20, 2001

(65) Prior Publication Data

US 2002/0133254 A1 Sep. 19, 2002

Related U.S. Application Data

(60) Provisional application No. 60/257,173, filed on Dec. 22, 2000.

(51) Int. Cl.
*G06F 11/00* (2006.01)
(52) U.S. Cl. .................................................. 702/188
(58) Field of Classification Search ............... 702/188, 702/56, 127, 185, 62; 700/83, 108–109, 700/9, 217, 95–96, 115–117; 600/300; 318/490; 340/540, 506, 56, 539; 714/4, 57; 709/217; 379/102.07, 102, 506; 62/126–127
See application file for complete search history.

(56) References Cited

U.S. PATENT DOCUMENTS

| | | | |
|---|---|---|---|
| 4,032,907 A | 6/1977 | Young | 340/213 R |
| 4,125,892 A | 11/1978 | Fakuda et al. | 364/200 |
| 4,847,894 A * | 7/1989 | Chanvin et al. | 379/102.07 |
| 5,225,997 A * | 7/1993 | Lederer et al. | 702/185 |
| 5,460,006 A * | 10/1995 | Torimitsu | 62/127 |
| 5,845,230 A * | 12/1998 | Lamberson | 702/56 |
| 5,852,351 A * | 12/1998 | Canada et al. | 318/490 |
| 5,907,491 A * | 5/1999 | Canada et al. | 700/108 |
| 5,946,922 A * | 9/1999 | Viard et al. | 62/126 |
| 5,959,529 A * | 9/1999 | Kail, IV | 340/539.12 |
| 6,028,522 A | 2/2000 | Petite | |
| 6,161,962 A | 12/2000 | French et al. | |
| 6,219,648 B1 * | 4/2001 | Jones et al. | 705/8 |
| 6,262,550 B1 | 7/2001 | Kliman et al. | 318/565 |
| 6,301,551 B1 * | 10/2001 | Piscalko et al. | 702/188 |
| 6,317,639 B1 * | 11/2001 | Hansen | 700/83 |
| 6,416,471 B1 * | 7/2002 | Kumar et al. | 600/300 |
| 6,437,691 B1 * | 8/2002 | Sandelman et al. | 340/506 |
| 6,437,692 B1 * | 8/2002 | Petite et al. | 340/540 |
| 6,477,667 B1 * | 11/2002 | Levi et al. | 714/57 |
| 6,510,350 B1 * | 1/2003 | Steen et al. | 700/9 |
| 6,524,230 B1 * | 2/2003 | Harding et al. | 493/8 |
| 6,556,939 B1 * | 4/2003 | Wegerich | 702/127 |
| 6,574,679 B1 * | 6/2003 | Chliwnyj et al. | 710/10 |
| 6,594,589 B1 * | 7/2003 | Coss et al. | 702/34 |
| 6,636,983 B1 * | 10/2003 | Levi | 714/4 |
| 6,658,586 B1 * | 12/2003 | Levi | 714/4 |
| 2001/0010032 A1* | 7/2001 | Ehlers et al. | 702/62 |
| 2002/0016829 A1* | 2/2002 | Defosse | 709/217 |
| 2003/0023703 A1* | 1/2003 | Hayward et al. | 709/217 |
| 2004/0095237 A1* | 5/2004 | Chen et al. | 340/506 |

* cited by examiner

*Primary Examiner*—Tung S Lau
*Assistant Examiner*—Aditya S Bhat
(74) *Attorney, Agent, or Firm*—Wood, Herron & Evans, LLP

(57) ABSTRACT

An apparatus and method that includes attaching a controller to a piece of equipment so that it may be monitored from a remote location. The controller communicates to an apparatus as to the operability and condition of the equipment. This data is stored and available for viewing. The apparatus also alerts appropriate individuals to any problems when detected.

45 Claims, 2 Drawing Sheets

EQUIPMENT MONITORING SYSTEM AND METHOD

This application claims priority to the provisional U.S. patent application entitled, Cryosoft, filed Dec. 22, 2000, having a Ser. No. 60/257,173, the disclosure of which is hereby incorporated by reference.

FIELD OF THE INVENTION

The present invention relates generally to monitoring of equipment. More particularly, the present invention relates to remote site monitoring through the use of embedded devices in the equipment.

BACKGROUND OF THE INVENTION

A large number of companies, universities and even individuals purchase commercial equipment such as refrigerators or coolers for storing environmentally sensitive products for a variety of reasons such as experiments, research or storage. A great deal of time is spent monitoring this equipment to ensure it is functioning properly. Failure to do so could have dire consequences. The contents contained in the equipment could be destroyed if the device fails and the temperature inside becomes a hazard to the contents. Such a predicament can have significant financial burden on the owner of the equipment as well as those who have contents therein.

To help alleviate this potential threat, companies monitor the devices with a variety of means. Some solutions have been a built-in temperature gauge. The readout from the gauge can be placed on the outside or inside of the equipment. An individual, whose responsibility it is to monitor the equipment, must check the gauges to ensure operability.

However, this system or method is prone to error. For instance, if the gauge breaks and is pegged on the last known temperature, a simple reading of the gauge is not sufficient.

Furthermore, the gauge measures the overall temperature in the equipment. Some areas of the refrigerator might run colder or even warmer than what the temperature gauge is actually reporting. This could have a tremendous impact on specimens in these areas of the equipment.

Another error is that the individual monitoring the equipment cannot be on-site twenty-four hours a day and seven days a week. Systems break down at all times during the day. Extended periods without monitoring can be costly and damaging. To employ a system that uses a constantly staffed monitoring system would be time consuming and costly.

Finally, the products on the market today cannot predict upcoming service problems. Accordingly, it is desirable to provide a system that is capable of monitoring equipment on a continuous basis as well as predict possible failure, which is resolved in an efficient manner.

SUMMARY OF THE INVENTION

In a first aspect of the present invention, a method and an apparatus to monitor equipment and its performance from a remote location is provided. Furthermore, each piece of equipment is monitored to ensure that it is well-maintained within pre-defined limits. If the equipment deviates outside these limits, the invention takes action in-line with the user's wishes.

In another aspect of the invention, remote monitoring is accomplished by installing a controller into each piece of equipment that needs to be monitored. The equipment is then monitored by an apparatus that includes an input device, a display device and executable software and a communications device.

In another aspect of the present invention, a unique identifier is associated with each piece of equipment. The identifier is stored on the controller, which is attached to the equipment. Through the unique identifier, the apparatus tracks and monitors each piece of equipment. It monitors the equipment by transmitting a query from the apparatus to the controller. The controller responds by transmitting specific data back to the controller.

In another aspect of the present invention, the user is provided with the ability to control or adjust certain features of the equipment. In the preferred embodiment, the ability is exercised after data from the equipment is sampled. The data is then compared to pre-defined limits of operation. If the equipment is within the limits, then generally no action is taken. If the equipment is not within certain limits, then corrective action is taken in order to remedy the situation.

The corrective action can be a number of different options. For example, the action taken can result in adjusting the operational ability such as temperature and exhaust functions. It also can alert specific individuals or personnel as to the problem or potential problem.

In another aspect of the present invention, a view of the data collected is provided for a user. The data is stored for an extended period of time or it is held for a data-monitoring window and then released or cleared.

In another aspect of the invention, a method for remote diagnostic and control capability for equipment is provided. The method includes storing a unique identifier on a controller that is linked to a piece of equipment and monitoring the equipment through the controller with an apparatus that includes an input device, display device, a communications device and software code executed by the apparatus. A further step includes identifying to the software code what data to collect.

Another step is compiling the data from the equipment by querying the controller with a request for data. The data is gathered and stored for a fixed period of time or a longer period of time and made available for review by the apparatus. The gathered data, if desired, is compared to pre-selected limits of operational ability that are selected for the equipment. If the results are within the operational limits, then generally no action is taken. If the results of the comparison are outside the operational limits, then corrective action is taken.

The corrective action is predetermined and commences upon a triggering event. In a situation where the equipment is operating outside the ranges, this becomes the triggering event. The predetermined action is alerting individuals such as a user or technician. Alerting can be in the form of a text message or a pre-recorded voice message. The corrective action can also be to adjust the operational ability of the equipment.

In another aspect of the invention, remote diagnostic and control capability for equipment is provided. The capability includes means for storing a unique identifier on a controller, which is attached to the equipment and means for monitoring the equipment through the controller. In the preferred embodiment, the means for monitoring is an apparatus that includes an input device, display device, a communications device and software code executed by the apparatus.

Further elements of the device are means for selecting the data to be collected from the equipment. After the means for selection, means for compiling is accomplished by querying the controller with request for data.

Another aspect of the device is means for comparing the data received from the controller with pre-selected limits. If the results of the comparison are outside of the acceptable limits, then the apparatus proceeds with a predefined action. If the results of the comparison are within the acceptable limits, then no further action is taken. Some of the predefined actions are alerting an individual or a technician, as to the performance of the equipment, and/or adjusting certain features of the equipment. Alerting a person can be accomplished by sending a message or playing a prerecorded message.

There has thus been outlined, rather broadly, the more important features of the invention in order that the detailed description thereof that follows may be better understood, and in order that the present contribution to the art may be better appreciated. There are, of course, additional aspects of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

A preferred embodiment of the present invention provides an apparatus that monitors and controls the operation of equipment such as high-grade appliances (e.g. industrial grade refrigerators or coolers that house environmentally sensitive products). The invention accomplishes this by the use of a controller that is attached to the equipment and able to communicate with the apparatus through a communication medium such as a direct connection or a network. The apparatus queries the equipment through the controller on a continuous basis to obtain status and operability of the equipment.

Figure 1:
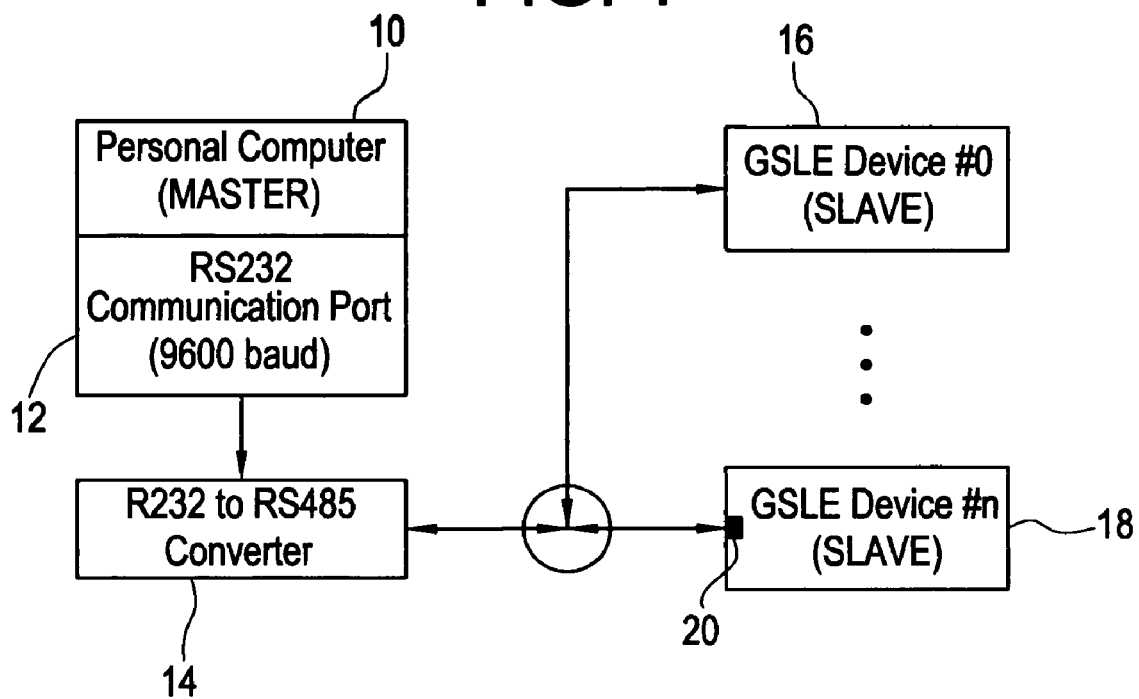
FIG. 1 is a schematic illustrating several elements of a preferred embodiment of the present invention.

A preferred embodiment of the present invention is illustrated in FIG. 1. The present invention includes a personal computer equipped with a microprocessor. The invention further includes a display device, input device and a communications port 12, which in the preferred embodiment is an RS232 communications port with a 9600-baud rate. The RS232 output is transmitted through an RS485 converter 14 in order for it to communicate with the equipment 16.

The apparatus 10 can communicate with a plurality of equipment. The network topology employed resembles a Master/Slave relationship. The Master, apparatus 10, sends a query to a particular slave, equipment 16. The slave device then acts upon the received query and may or may not return a message to the master.

The apparatus 10 has by the ability to run executed software code. In the preferred embodiment, a personal computer is employed. However, one of skill in the art recognizes that a handheld device or a portable microprocessor unit is equally capable of running software code that enables the devices to communicate.

The serial number is a key component of the system, especially in the situation where the apparatus 10 is monitoring multiple pieces of equipment 16,18 not necessary identical in nature. The serial number is also referred as to a unique identifier.

In the preferred embodiment, the serial number is assembled using an array of data that is unique to the equipment. Table 1 below illustrates one such method for assembling the number.

TABLE 1

| Serial Number Format Field Name | Example |
| --- | --- |
| First Character Manufactured Month./Year | S |
| Two Digit Numeric Shipped Day | 25 |
| Second Character Manufactured Month/Year | H |
| Six Numeric Unique ID | 383645 |
| Two Character Shipped Month/Year | TH |
| Device Brand | R |
| Device Feature Set | A |
| Device Type | 4 |

In this example, the serial number is compiled using a number of pieces of data that helps the apparatus 10 decode certain aspects of the equipment 14. This is not the only way to construct a number but it does aid in evaluating the piece of equipment as well as during the initial setup. The software code is able to deal with certain pieces of equipment by merely evaluating the last three bits of data on the serial number and comparing it to the acceptable limits of operation for that particular piece of equipment.

The serial number constructed, as detailed in Table 1, is helpful in situations where a third-party is monitoring the equipment. This third-party, in this instance, is usually referred to as a monitoring service. Therefore, when a problem does occur, the information contained in the serial is critical to diagnosing and properly servicing the equipment.

The query process involves the apparatus 10 communicating with the equipment 16 through the controller 20. The messages are sent space parity and are intended for only one apparatus 10. Just prior to these messages, the network address is broadcast at mark parity so that when the embedded device receives the mark address, twice consecutively, the controller 20 begins to turn its attention to the message received. In other words, it is placed into reading mode. This enables the equipment to listen for the specific types of messages.

For every outbound message, a known response is expected from a controller 20. Characteristics of the expected response, such as the number of bytes in the message and field parameters, are defined. In addition, the embedded controller can issue a longitudinal redundancy check failure error message. At any rate, the apparatus 10 can determine if a message has been received properly, in error, or not at all when one was expected. If a failure does occur, the specific query message is resent up to three times by the apparatus 10. On the third fail, the apparatus 10 removes the equipment 16 from the network and no features will be performed on this equipment 16 and an icon of the equipment 16 is updated indicating the communication fault mode. The communication fault mode is logged to a database.

At this point, the equipment 16 enters a communication recovery mode. At a defined time interval, the command query requesting the serial number for the equipment 16 is issued by the apparatus 10. If the correct response is received, the apparatus 10 will restore the equipment 16 on the network and update the icon appropriately. The restoration process is also logged to the communications error database. The user has the capability to view and generate reports from this database. In addition, the user can purge the database at anytime. The database also contains an integer error code, which provides useful diagnostic insight as to what the communications fault entails.

Below is a non-exhaustive list of queries and responses employed with the present invention for communication between the apparatus 10 and the equipment 16. These commands are designed to be transcribed by an 80C32 microcontroller. The message structure employed by the invention is a quasi-ASCII ModBUS message architecture. The error checking is commonly referred to as a longitudinal-redundancy-check.

A. Read Word From Embedded Internal Ram:

| Query: Read Word from Embedded Internal Ram: 9 bytes | | | | | | | | |
|---|---|---|---|---|---|---|---|---|
| Byte 0 | Byte 1 | Byte 2 | Byte 3 | Byte 4 | Byte 5 | Byte 6 | Byte 7 | Byte 8 |
| 3Ah | Net Address (Adr) | 03h | N/A | Address Low to Read | N/A | N/A | LRC | Dah |

| Response: Read Word from Embedded Internal Ram: 8 bytes | | | | | | | |
|---|---|---|---|---|---|---|---|
| Byte 0 | Byte 1 | Byte 2 | Byte 3 | Byte 4 | Byte 5 | Byte 6 | Byte 7 |
| 3Ah | Net Adr | 03h | Byte Count (always 2h) | High Mem Data Byte | Low Mem Data Byte | LRC | Dah |

B. Write Word To Embedded Internal RAM

This command writes a word to the internal RAM memory in the controller.

| Query: Write Word to Embedded Internal Ram: 9 bytes | | | | | | | | |
|---|---|---|---|---|---|---|---|---|
| Byte 0 | Byte 1 | Byte 2 | Byte 3 | Byte 4 | Byte 5 | Byte 6 | Byte 7 | Byte 8 |
| 3Ah | Net Adr | 05h | Adr High to Write | Adr low to Write | Data High to Write | Data Low to Write | LRC | DAh |

| Response: Write Word to Embedded Internal Ram: 9 bytes | | | | | | | | |
|---|---|---|---|---|---|---|---|---|
| Byte 0 | Byte 1 | Byte 2 | Byte 3 | Byte 4 | Byte 5 | Byte 6 | Byte 7 | Byte 8 |
| 3Ah | Net Adr | 05h | Adr High Written to | Adr Low Written to | Data High Written | Data Low Written | LRC | DAh |

C. Read Byte From Embedded EEPROM

This command reads a byte from an embedded EEPROM.

| Query: Read Byte From Embedded EEPROM: 9 bytes | | | | | | | | |
|---|---|---|---|---|---|---|---|---|
| Byte 0 | Byte 1 | Byte 2 | Byte 3 | Byte 4 | Byte 5 | Byte 6 | Byte 7 | Byte 8 |
| 3Ah | Net Adr | 0Ah | N/A | Adr to Read | N/A | N/A | LRC | DAh |

| Response: Read Byte From Embedded EEPROM: 8 bytes | | | | | | | |
|---|---|---|---|---|---|---|---|---|
| Byte 0 | Byte 1 | Byte 2 | Byte 3 | Byte 4 | Byte 5 | Byte 6 | Byte 7 |
| 3Ah | Net Adr | 0Ah | Byte Count (always 01h) | N/A | Data Read | LRC | DAh |

D. Write Byte To Embedded EEPROM

This command writes a byte of data to the embedded EEPROM.

| Query: Write Byte to Embedded EEPROM: 9 bytes | | | | | | | | |
|---|---|---|---|---|---|---|---|---|
| Byte 0 | Byte 1 | Byte 2 | Byte 3 | Byte 4 | Byte 5 | Byte 6 | Byte 7 | Byte 8 |
| 3Ah | Net Adr | 0Bh | N/A | Adr to Write | N/A | Data to Write | LRC | DAh |

| Response: Write Byte to Embedded EEPROM: 9 bytes | | | | | | | | |
|---|---|---|---|---|---|---|---|---|
| Byte 0 | Byte 1 | Byte 2 | Byte 3 | Byte 4 | Byte 5 | Byte 6 | Byte 7 | Byte 8 |
| 3Ah | Net Adr | 0Bh | N/A | Adr Written to | N/A | Data Written | LRC | DAh |

E. Read Word From Embedded External RAM

This command reads a word from external memory.

| Query: Read Word From Embedded External RAM: 9 bytes | | | | | | | | |
|---|---|---|---|---|---|---|---|---|
| Byte 0 | Byte 1 | Byte 2 | Byte 3 | Byte 4 | Byte 5 | Byte 6 | Byte 7 | Byte 8 |
| 3Ah | Net Adr | 07h | Adr High to Read | Adr Low to Read | N/A | N/A | LRC | DAh |

Response: Read Word From Embedded External RAM: 9 bytes

| Byte 0 | Byte 1 | Byte 2 | Byte 3 | Byte 4 | Byte 5 | Byte 6 | Byte 7 | Byte 8 |
|---|---|---|---|---|---|---|---|---|
| 3Ah | Net Adr | 0Bh | N/A | Adr Written to | N/A | Data Written | LRC | DAh |

F. Write Word to Embedded External RAM

This command writes a word to external RAM memory.

Query: Write Word to Embedded External RAM: 9 bytes

| Byte 0 | Byte 1 | Byte 2 | Byte 3 | Byte 4 | Byte 5 | Byte 6 | Byte 7 | Byte 8 |
|---|---|---|---|---|---|---|---|---|
| 3Ah | Net Adr | 04h | Adr High to Write | Adr Low to Write | Data High to Write | Data Low to Write | LRC | DAh |

Response: Write Word to Embedded External RAM: 9 bytes

| Byte 0 | Byte 1 | Byte 2 | Byte 3 | Byte 4 | Byte 5 | Byte 6 | Byte 7 | Byte 8 |
|---|---|---|---|---|---|---|---|---|
| 3Ah | Net Adr | 04h | Adr High Written to | Adr Low Written to | Data High Written | Data Low Written | LRC | DAh |

G. Read ADC Channel

This command accesses any of the eight analog-to-digital (ADC) channels and return the raw data in 12-bit unsigned format.

Query: Read ADC Channel: 6 bytes

| Byte 0 | Byte 1 | Byte 2 | Byte 3 | Byte 4 | Byte 5 |
|---|---|---|---|---|---|
| 3Ah | Net Adr | 09h | Chan# (0-7) | LRC | Dah |

Response: Read ADC Channel: 8 bytes

| Byte 0 | Byte 1 | Byte 2 | Byte 3 | Byte 4 | Byte 5 | Byte 6 | Byte 7 |
|---|---|---|---|---|---|---|---|
| 3Ah | Net Adr | 09h | Chan # (0-7) | ADC High Data Byte | ADC Low Data Byte | LRC | Dah |

H. Retrieve Serial Number:

This command returns the programmed 15-byte serial number of the device.

Query: Retrieve Serial Number: 5 bytes

| Byte 0 | Byte 1 | Byte 2 | Byte 3 | Byte 4 |
|---|---|---|---|---|
| 3Ah | Net Adr | 08h | LRC | DAh |

Response: Read ADC Channel: 20 bytes

| Byte 0 | Byte 1 | Byte 2 | Byte 3 to Byte 17 | Byte 18 | Byte 19 |
|---|---|---|---|---|---|
| 3Ah | Net Adr | 08h | 15-Byte Serial # | LRC | DAh |

I. Force Delog Cycle

This command forces a delog cycle. All short-cycle restrictions are still in effect.

Query: Force Delog Cycle: 5 bytes

| Byte 0 | Byte 1 | Byte 2 | Byte 3 | Byte 4 |
|---|---|---|---|---|
| 3Ah | Net Adr | 06h | LRC | DAh |

There is no response expected for this message query.

J. Set Local Network Address

This command sets the local network address. The preprogrammed serial number is sent and compared. If a match occurs the Net Adr field is defined as the local network address for the device.

Query: Set Local Network Address: 20 bytes

| Byte 0 | Byte 1 | Byte 2 to Byte 16 | Byte 17 | Byte 18 | Byte 19 |
|---|---|---|---|---|---|
| 3Ah | F5h | 15 Byte Serial # | Net Adr | LRC | DAh |

K. Program Serial Number (Point to Point)

This command programs the serial number and only used on a Point-to-Point network topology.

Query: Program Serial Number (Point to Point Only): 19 bytes

| Byte 0 | Byte 1 | Byte 2 to Byte 16 | Byte 3 to Byte 17 | Byte 18 |
|---|---|---|---|---|
| 3Ah | F9h | 15-Byte Serial # | LRC | Dah |

Response: Program Serial Number (Point to Point Only): 5 bytes

| Byte 0 | Byte 1 | Byte 2 to Byte 16 | Byte 3 | Byte 18 |
|---|---|---|---|---|
| 3Ah | F9h | 31h | LRC | Dah |

L. LRC Rx

This message can be the response of any query.

Response: LRC Rx: 7 bytes

| Byte 0 | Byte 1 | Byte 2 | Byte 3 | Byte 4 | Byte 5 | Byte 6 |
|---|---|---|---|---|---|---|
| 3Ah | FAh | 33h | Sent LRC | Calc LRC | LRC | DAh |

Additionally, the invention can become a Winsock (TCP/IP) server. In this mode, features are disabled. This allows a companion client application too remotely access (e.g. the interet) data from the apparatus 10 directly or any embedded control device on the user local area network (LAN). Below is a non-exhaustive list of command queries available with the Winsock connection.

Winsock Feature

A. Retrieve Device Serial Numbers

This command retrieves a comma-delimited list of all devices by serial number that a user has added to the LAN. It does not distinguish devices that maybe in communication failure mode.

Query: Retrieve Device Serial Numbers:

| 7-Character Command | Additional Information |
|---|---|
| DEVICES | |

Response: Retrieve Device Serial Numbers

The response is a comma-delimite string list of all serial numbers that have been added to the users LAN.

B. Retrieve Communications Error Database

This command retrieves a database that contains communications fault information.

Query: Retrieve Communications Error Database

| 7-Character Command | Additional Information |
|---|---|
| COMMERR | |

Response: Retrieve Communications Error Database

The actual database file used by the application.

C. Retrieve Telephone Call Database

This command retrieves a database that contains information regarding telephone alarm calls.

Query: Retrieve Telephone Call Database

| 7-Character Command | Additional Information |
|---|---|
| PHONLOG | |

Response: Retrieve Telephone Call Database

The actual database file used by the application.

D. Retrieve E-Mail Database

This command retrieves a database that contains information regarding e-mail alarms.

Query: Retrieve E-Mail Database

| 7-Character Command | Additional Information |
|---|---|
| EMAILLG | |

Response: Retrieve E-Mail Database

The actual DBF file used by the application.

E. Retrieve Remote Logon Database

This command retrieves a database that contains information regarding remote logons.

Query: Retrieve Remote Logon Database

| 7-Character Command | Additional Information |
|---|---|
| REMACTL | |

Response: Retrieve Remote Logon Database

The actual DBF file used by the application.

F. Retrieve Historic Log Database

This command retrieves a database that contains information regarding the selected device performance.

Query: Retrieve Historic Log Database

| 7-Character Command | Additional Information |
|---|---|
| HISTLOG | Parameter 1-15 byte serial number as parameter |

Response: Retrieve Historic Log Database

The actual historic log for the serial number sent as parameter 1 as a database file.

G. Retrieve Archived Historic Log Database

This command retrieves a database that contains information regarding the selected device performance.

Query: Retrieve Historic Log Database

| 7-Character Command | Additional Information |
|---|---|
| HISTLGA | Parameter 1-15 byte serial number as parameter |

Response: Retrieve Historic Log Database

The actual archived historic log for the serial number sent as parameter one as a database file.

H. Read for Specific Device

This command reads messages of variable length (consecutive and increasing) memory locations from either internal or external RAM.

| Query: Read Specific Device | |
|---|---|
| 7-Character Command | Additional Information |
| READDEV | Parameter 1—Read type (0 = RAM, 1 = Xdata, 2 = EEPROM, 4 = ADC)<br>Parameter 2—Address Low Byte (ch for ADC type 0-7)<br>Parameter 3—Address High Byte (not used for RAM, EEPROM or ADC)<br>Parameter 4—Length (not used for XDATA or ADC) |

Response: Read Specific Device
Varies by read type:
NOTE: could be "ERROR"
RAM>"RAM 0x000=FF . . . " to length
XDATAA 0x001=FF,XDATAA 0x001=FF" (only retrieves two bytes)
EEPROM>"EEPROM 0x0-FF, EEPROM 0x01=FF . . . " to length
ADC>"ADC CH0=0.000"

I. Write for Specific Device

This command has the capability of reading variable length (consecutive and increasing) memory locations from either or external RAM.

| Query: Write Specific Device | |
|---|---|
| 7-Character Command | Additional Information |
| WRITEDV | Parameter 1—Write type (0 = RAM, 1 = Xdata, 2 = EEPROM)<br>Parameter 2—Address Low Byte<br>Parameter 3—Address High Byte (not used for RAM, EEPROM)<br>Parameter 4—Data High Low Byte<br>Parameter 5—Data High Byte |

Response: Read Specific Device
Varies by read type:
NOTE: values are read after written to determine this message could be "ERROR"
RAM>"RAM 0x0=FF, RAM 0x1=FF"
XDATA 0x000=FF,XDATAA 0x001=FF"
EEPROM>"EEPROM 0x0=FF J. Read Specific Device Alarm Status This command retrieves a database that contains information regarding the selected device performance.

| Query: Retrieve Historic Log Database | |
|---|---|
| 7-Character Command | Additional Information |
| DEVSTAT | Parameter 1-15 byte serial number as parameter |

Response: Retrieve Historic Log Database

The software code, in the preferred embodiment, has a number of features for collecting and observing the data. The preferred embodiment provides four basic views for examining the data. They are (a) set-point; (b) data; (c) ten minute, real time graph; and (d) historic graph. These views provide the user with different insights to the currently selected device.

The set-point view allows the user to remotely select control parameters for a particular piece of equipment. It distinguishes between devices such as a minus thirty, minus 20 and plus 4 and ultra low temperature freezers as well as feature set ( e.g. A, B, C which correspond to house, private label with alarm and private label) in order to provide the correct adjustable parameters. The differentiation of the device types and features sets is determined by decoding the serial number of the device.

The set-point view requires the user to enter a password that has been previously been set in order for a change in settings to be accepted and written out to the embedded controller. If no activity occurs on the set-point view for thirty seconds, then the view times out.

The data view features the ability for the user to view the entire historic logging history database table for the selected device. The user selects the current data or the archived data table. This view also permits some basic statistical analysis. The user selects a range of records and have the average, minimum and maximum of the selected range reported in a message box. A report of the database can also be generated and printed.

The real-time graph or ten-minute history view collects current temperature data in a graphical format every fifteen seconds. Once ten minutes worth of data has been collected, approximately forty points, the most current data is displayed. If the selected device changes, then the ten-minute data buffer is cleared and commences to re-build ten minutes worth of data.

The historic logging view enables the user to select a data range and to look at the historic logging parameters for up to seven series on one graph. The user can select which logged variable to view on the graph. The user can also zoom and drag the graph to customize the graph. A hard copy of the graph is also obtainable.

Feature Set

The following are a few feature sets included in the software in the preferred embodiment.

A. Current Temperature Scan

This feature updates the current temperature in numeric format for the selected device. If the selected device changes, then numerical data is cleared at the next sixty-second rollover. The newly selected device will be queried and reported. This feature is independent of the current data view that the user has selected.

B. Alarm Scan

This feature scans all the devices that are on the users network every five minutes for active and past alarms for power failure, warm temperature and cold temperature alarm. If the device has any alarms, the icon in the device window is changed to an alarm icon visually indicating the alarm status temperature. This feature also looks for active warm alarm and cold alarms. If either alarm has been active for at least one hour for any device on the user's network, then a call is placed via a user-installed modem to a user entered telephone number. The call repeats a default message recorded as a WAV file.

C. Historic Logging

This feature scans all the devices with historic logging enabled at a user selectable interval. Current temperature, offset, set-point, warm alarm set-point, cold alarm set-point, and all the variables are recorded and time stamped to a database table for each device in the network.

D. Supervisory Utilities

This option allows programming of an original serial number or to overwrite a serial number on a point-to-point network. In addition, the user can read the voltage on any of the eight available ADC channels and have the voltage output to a window message box. The user can enter in any external RAM address and receive the data at that address and the one above it in memory.

E. Cumulative On-Time

This feature enables the user to determine the total cumulative on time performance for the selected device. It reports the seconds, minutes, hours, days, months and years that a device has been on.

F. Excursions

This feature allows users to remotely examine the excursions of the currently selected device.

G. Manufactured Date

This feature allows the user to know the manufactured data of the selected device in month, day and year format.

H. Shipped Date

The feature allows a user to determine the date in month format for when the selected device was shipped.

I. Force Delog

This feature allows a user too remotely force a delog cycle for the selected unit.

Figure 2:
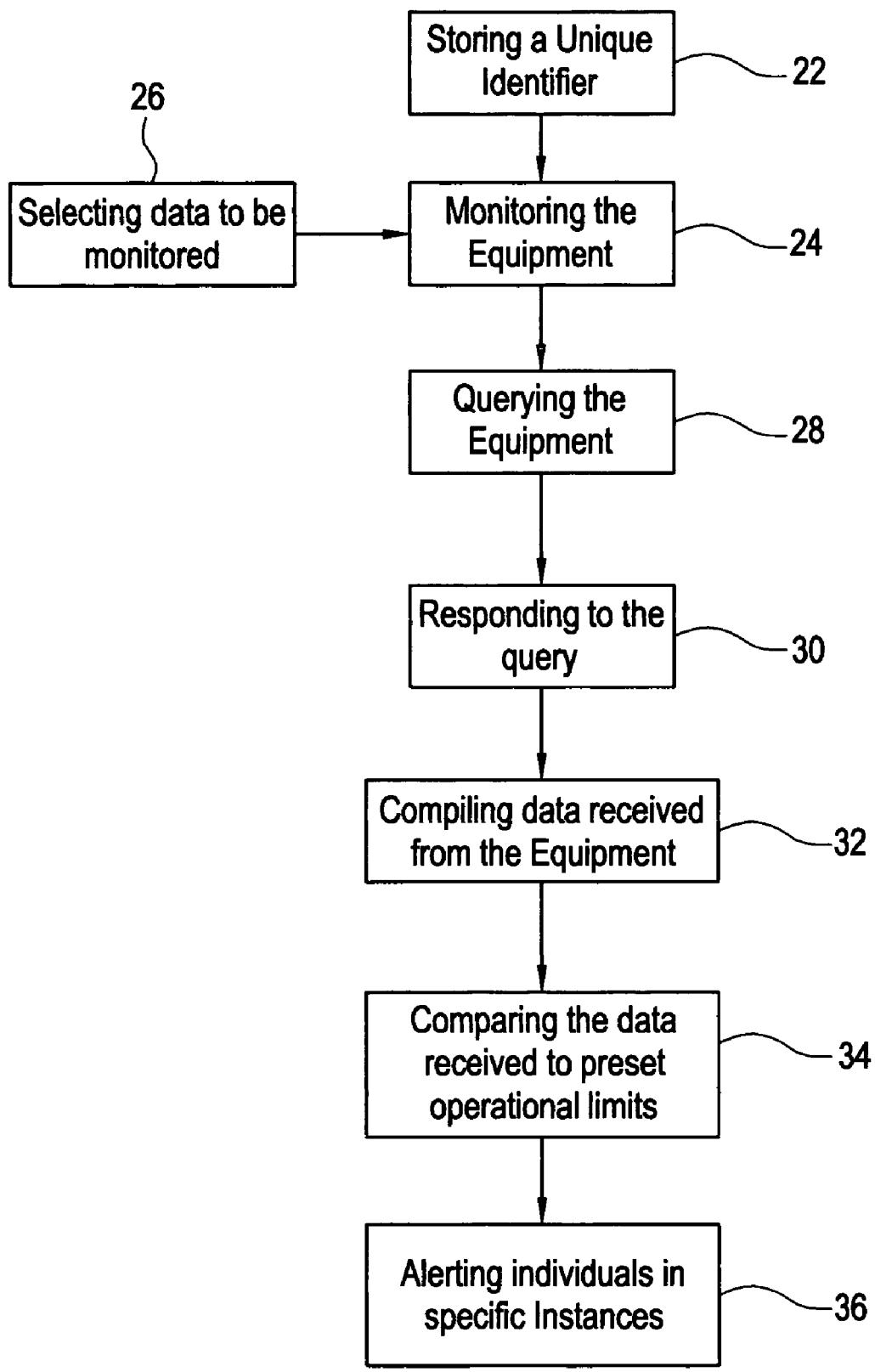
FIG. 2 is a flowchart illustrating the steps that may be followed in accordance with one embodiment of the present inventive method.

FIG. 2 is a flowchart illustrating the steps that may be followed in accordance with one embodiment of the present inventive method. The first step in this method is storing 22 a unique identifier into a controller 20 that is attached to the equipment 16 to be monitored. The next step in the method is monitoring 24 the equipment with an apparatus that has an input and display device as well as executable software stored on the device. The software executes a program that enables the apparatus 10 and the equipment 14 to communicate.

The software, in the preferred embodiment, queries the equipment over a user-defined interval. Prior to querying the equipment, the step of selecting 26 data to be collected is entered in by the user. Upon this selection, the step of querying 28 the equipment is sent by the executable code through communications device 12. Upon receipt of a query that was intended for the equipment, the next step of responding 30 is undertaken. Note that all queries do not require a response. However, a majority of them do.

After a response is received from the controller, the next step is compiling 32 the data at the apparatus. The data can be stored for an extended period of time or just until the next data collection period.

After compiling the data, the next step is comparing 34 the data with preset operational limits set by the user. If the data is within the limits, then generally no action is taken but the storing of the data. If the data is not within the limits, then alerting 36 is the next step. Alerting 36 can be sending a message or even making a prerecorded call to a selected individual.

The many aspects of the invention are apparent from the detailed specification, and thus, it is intended by the appended claims to cover all such aspects of the invention, which fall within the true spirit, and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A device that provides diagnostic and control capability for equipment from a remote location comprising:

an apparatus detached from the equipment comprising a display device, an input device, software executed by the apparatus and a communications device;

a hardware controller attached to the equipment to enable monitoring of the equipment by the apparatus through the communications device; and a second hardware controller attached to a second equipment to enable monitoring of the second equipment through the communication device, wherein a unique identifier is stored on an embedded memory of the hardware controller, the unique identifier is compiled using parts of data accommodating decoding specific manufacturing configurations of the equipment, the embedded memory including a database of operating state of the equipment readable by the apparatus detached from the equipment, the specific manufacturing configurations of the equipment includes specific mechanical components of the equipment, and further including the second equipment with a second unique identifier, the second equipment with the second hardware controller being networked with the equipment and the apparatus, the second controller accommodating a reading and writing of the unique identifier information by the apparatus.

2. The device as in claim 1, wherein the controller is queried by the apparatus, and wherein information in the unique identifier accommodating diagnosing and servicing of the equipment.

3. The device as in claim 2, wherein the controller transmits data in response to the query, the embedded memory including a database of alarm conditions of the equipment and the environmental conditions of the equipment, readable by the apparatus detached from the equipment, the embedded memory including embedded random access memory and embedded electrically erasable programmable read-only memory upon which read and write commands are executed.

4. The device as in claim 2, wherein the controller is instructed by the software code to gather specific data about the equipment and transmitted to the apparatus.

5. The device in claim 4, wherein the data is compiled by the software in a user preferred manner.

6. The device of claim 4, wherein the data is collected for a specific period of time after which time the data is lost and a new data collection period begins.

7. The device of claim 6, wherein the data is available for review by a user on the apparatus during the specific period of time.

8. The device of claim 4, wherein the data is recorded and stored and available for review by the user.

9. The device as in claim 1, wherein the controller transmits data to the apparatus without being queried, and wherein the hardware controller being embedded in the equipment, and the unique identifier comprising manufactured date of the equipment, shipment date of the equipment, device brand of the equipment, device feature set of the equipment; device type of the equipment, and operating limits of the equipment.

10. The device of claim 9, wherein the data being transmitted is an indication detected by the controller of an equipment problem.

11. The device of claim 1, wherein the software code is programmed with acceptable operational limits for the equipment associated with the identifier, evaluating certain bits of data on the unique identifier and comparing the unique identifier to acceptable operational limits for the equipment.

12. The device of claim 11, wherein the limits are compared to the data retrieved from said controller, if results are within the acceptable operational limits the data no further action is taken, if results are not within acceptable said limits then apparatus carries out a predefined task.

13. The device of claim 12, wherein the predetermined task is alerting the user as to the condition.

14. The device of claim 12, wherein the predetermined task is alerting a technician as to the performance of the equipment.

15. The device of claim 12, wherein the predetermined task is transmitting data to the equipment to adjust certain operational features of the equipment, a set-point view allowing remote selection of control parameters for the equipment, the differentiation of the equipment types, and feature sets being determined by decoding the unique identifier of the corresponding equipment, wherein the feature sets includes a current temperature scan, alarm scan of certain failure events of the corresponding equipment, scanning all equipment with historic logging, supervisory utilities, cumulative on-time, excursions, manufactured date, shipped date, and force delog.

16. The device as in claim 1, wherein the specific manufacturing configurations of the equipment comprises a manufacturer of the equipment.

17. The device as in claim 1, wherein the specific manufacturing configurations of the equipment comprises operating limits.

18. The device as in claim 1, wherein the specific manufacturing configurations of the equipment comprises manufacturer's serial number.

19. The device as in claim 1, wherein the specific manufacturing configurations of the equipment comprises a feature set of the equipment.

20. The device of claim 1, wherein the unique identifier with the operating state accommodates diagnosing and control of the equipment and second equipment by the apparatus.

21. A method that provides remote diagnostic and control capability for equipment comprising:
monitoring the equipment through a hardware controller attached the equipment with a remote apparatus comprised of an input device, display device, a communications device and software code executed by the apparatus;
storing a unique identifier on a memory of the controller that is attached to the equipment, the unique identifier is assembled using an array of data wherein specific manufacturing aspects of the equipment are compiled within the unique identifier using the array of data allowing decoding of the manufacturing aspects of the equipment, with certain bits of data of the unique identifier being evaluated to determine whether the equipment is within acceptable limits of operation for the equipment, the specific manufacturing configurations of the equipment comprises specific mechanical components of the equipment,
storing the operating state of the equipment on the memory of the controller;
storing a second unique identifier on a second equipment, the second equipment with a second controller being networked with the equipment and the apparatus, the second controller accommodating a reading and writing of the unique identifier information by the apparatus; and
diagnosing and controlling the equipment and the second equipment according to both the unique identifier and monitored operating state of the equipment and second equipment.

22. The method of claim 21, further comprising:
selecting with the software code specific data collection wherein the software code records the data of pre-selected features of the equipment; and
setting the local network address of the hardware controller for the remote apparatus, the preprogrammed unique identifier being sent and compared, when a match occurs, a net address field of the unique identifier being defined as the local network address for the hardware controller.

23. The method of claim 21, further comprising:
querying the controller with request for data, wherein the data is transmitted to the apparatus; and
when in communication fault, the equipment enters a communication recovery mode at a certain interval, the command query requests the unique identifier for the equipment issued by the remote apparatus, and when correct response is received, the remote apparatus restoring the equipment on a network and update the output.

24. The method of claim 23, further comprising responding and transmitting a response to the query, evaluating certain bits of data on the unique identifier and comparing the unique identifier to acceptable operational limits for the equipment to accommodate diagnosing the equipment.

25. The method of claim 24, further comprising compiling of the data by the apparatus and stored for a period of time.

26. The method of claim 25, wherein data collection is gathered for a fixed period of time after which the data is removed and a new data period is commenced.

27. The method of claim 25, wherein the data is recorded and stored and available for review.

28. The method of claim 25, further comprising comparing the data received from the controller with pre-selected limits, if the results of the comparison are outside of the acceptable limits then the apparatus proceeds with a predefined action; if the results of the comparison are with the acceptable limits then no further action is taken.

29. The method of claim 28, wherein the predefined action is alerting an individual.

30. The method of claim 29, wherein alerting an individual is accomplished by sending a message.

31. The method of claim 30, wherein the predefined action is playing a prerecorded message.

32. The method of claim 28, wherein the predefined action is alerting a technician as to the performance of the equipment.

33. The method of claim 28, wherein the predefined action is transmitting data to the equipment to adjust certain features of the equipment, for every outbound message to the controller, a known response being expected from a controller, characteristics of the expected response being defined, and embedded controller within the equipment issuing a redundancy check failure error message.

34. A device that provides remote diagnostic and control capability for equipment comprising:
remote means for monitoring the equipment, the means for monitoring is an apparatus that is comprised of an input device, display device, a communications device and software coded executed by the apparatus;
means for determining the status of the equipment through the means for monitoring, wherein the means for determining is a hardware device and is attached to the equipment and contains a unique identifier in an embedded memory, the unique identifier is assembled using an array of data wherein manufacturing aspects of the equipment are compiled within the unique identifier, the specific manufacturing configurations of the equipment includes specific mechanical components of the equipment; and a second equipment with a second unique identifier, the second equipment with a second controller being networked with the equipment and the apparatus, the second controller accommodating a reading and writing of the unique identifier information by the apparatus.

35. The device of claim 34, wherein the means for determining is a hardware controller.

36. The device of claim 35, further comprising means for compiling the data from the equipment by querying the controller with request for data.

37. The device of claim 36, wherein data collection is gathered for a fixed period of time after which the data is removed and a new data period is commenced.

38. The device of claim 36, wherein the data is recorded and stored and available for review.

39. The device of claim 36, further comprising means for comparing the data received from the controller with pre-selected limits, if the results of the comparison are outside of the acceptable limits then the apparatus proceeds with a predefined action, if the results of the comparison are with the acceptable limits then no further action is taken.

40. The device of claim 39, wherein the predefined action is alerting an individual.

41. The device of claim 40, wherein alerting an individual is accomplished by sending a message.

42. The device of claim 41, wherein the predefined action is playing a prerecorded message.

43. The device of claim 39, wherein the predefined action is transmitting data to the equipment to adjust certain features of the equipment.

44. The device of claim 34, further comprising:

a means for selecting with software code specific data collection wherein the software code records the data of pre-selected features of the equipment, and a means for a set-point view allowing remote selection of control parameters for the equipment, the differentiation of the equipment types, and feature sets being determined by decoding the unique identifier of the corresponding equipment, wherein the feature sets includes a current temperature scan, alarm scan of certain failure events of the corresponding equipment, scanning all equipment with historic logging, supervisory utilities, cumulative on-time, excursions, manufactured date, shipped date, and force delog.

45. A device that provides diagnostic and control capability for equipment from a remote location comprising:

an apparatus detached from the equipment comprising a display device, an input device, software executed by the apparatus and a communications device; and a hardware controller attached to the equipment to enable monitoring of the equipment by the apparatus through the communications device, wherein a unique identifier is stored on an embedded memory of the controller, wherein the unique identifier is compiled using parts of data accommodating decoding specific manufacturing configurations of the equipment, the embedded memory including a database of alarm conditions of the equipment and the environmental conditions of the equipment, readable by the apparatus detached from the equipment, the embedded memory including embedded random access memory and embedded electrically erasable programmable read-only memory upon which read and write commands are executed, wherein the specific manufacturing configurations of the equipment comprises specific mechanical components of the equipment, and further comprising a second equipment with a second unique identifier, the second equipment with a second controller being networked with the equipment and the apparatus, the second controller accommodating a reading and writing of the unique identifier information by the apparatus.

* * * * *

UNITED STATES PATENT AND TRADEMARK OFFICE
CERTIFICATE OF CORRECTION

PATENT NO. : 7,552,029 B2
APPLICATION NO. : 10/022194
DATED : June 23, 2009
INVENTOR(S) : Bryan M. Elwood It is certified that error appears in the above-identified patent and that said Letters Patent is hereby corrected as shown below:

In column 4, line 15, change "not necessary identical in nature." to --not necessarily identical in nature.--.

In column 9, line 22, change "client application too remotely access" to --client application to remotely access--.

In column 11, line 18, change "RAM>"RAM 0x000 = FF..." to length" to --RAM>"RAM 0x0000 = FF..." to length--.

In column 11, line 19, change "XDATAA 0x001 = FF,XDATAA 0x001=FF" (only retrieves two bytes)" to --XDATAA 0x0001 = FF,XDATAA 0x0001=FF" (only retrieves two bytes)--.

In column 11, line 21, change "EEPROM>"EEPROM 0x0-FF, EEPROM 0x01=FF..." to length" to --EEPROM>"EEPROM 0x00-FF, EEPROM 0x01=FF..." to length--.

In column 11, line 47, change "RAM>"RAM 0x0 = FF, RAM 0x1=FF"" to --RAM>"RAM 0x00 = FF, RAM 0x01=FF"--.

In column 11, line 48, change "XDATA 0x000=FF,XDATAA 0x001=FF" to --XDATA 0x0000 = FF,XDATAA 0x0001=FF"--.

In column 11, line 49, change "EEPROM>"EEPROM 0x0=FF" to --EEPROM>"EEPROM 0x00=FF--.

In claim 9, column 14, line 58, change "device feature set of the equipment;" to --device feature set of the equipment,--.

In claim 12, column 15, line 3, change "if results are within the acceptable operational limits the data no further action is taken, if results are not within acceptable said limits then apparatus carries out a predefined task." to --if results are within the acceptable operational limits then no further action is taken, if results are not within acceptable said limits then the apparatus carries out a predefined task.--.

In claim 21, column 15, line 40, change "attached the equipment with a remote apparatus" to --attached to the equipment with a remote apparatus--.

CERTIFICATE OF CORRECTION (continued)
U.S. Pat. No. 7,552,029 B2

In claim 36, column 17, line 11, change "The device of claim 35," to --The device of claim 34,--.

In claim 39, column 17, line 23, change "if the results of the comparison are with the" to --if the results of the comparison are within the--.

Signed and Sealed this

Twenty-third Day of March, 2010

David J. Kappos
*Director of the United States Patent and Trademark Office*